United States Patent Office 3,156,912
Patented Nov. 10, 1964

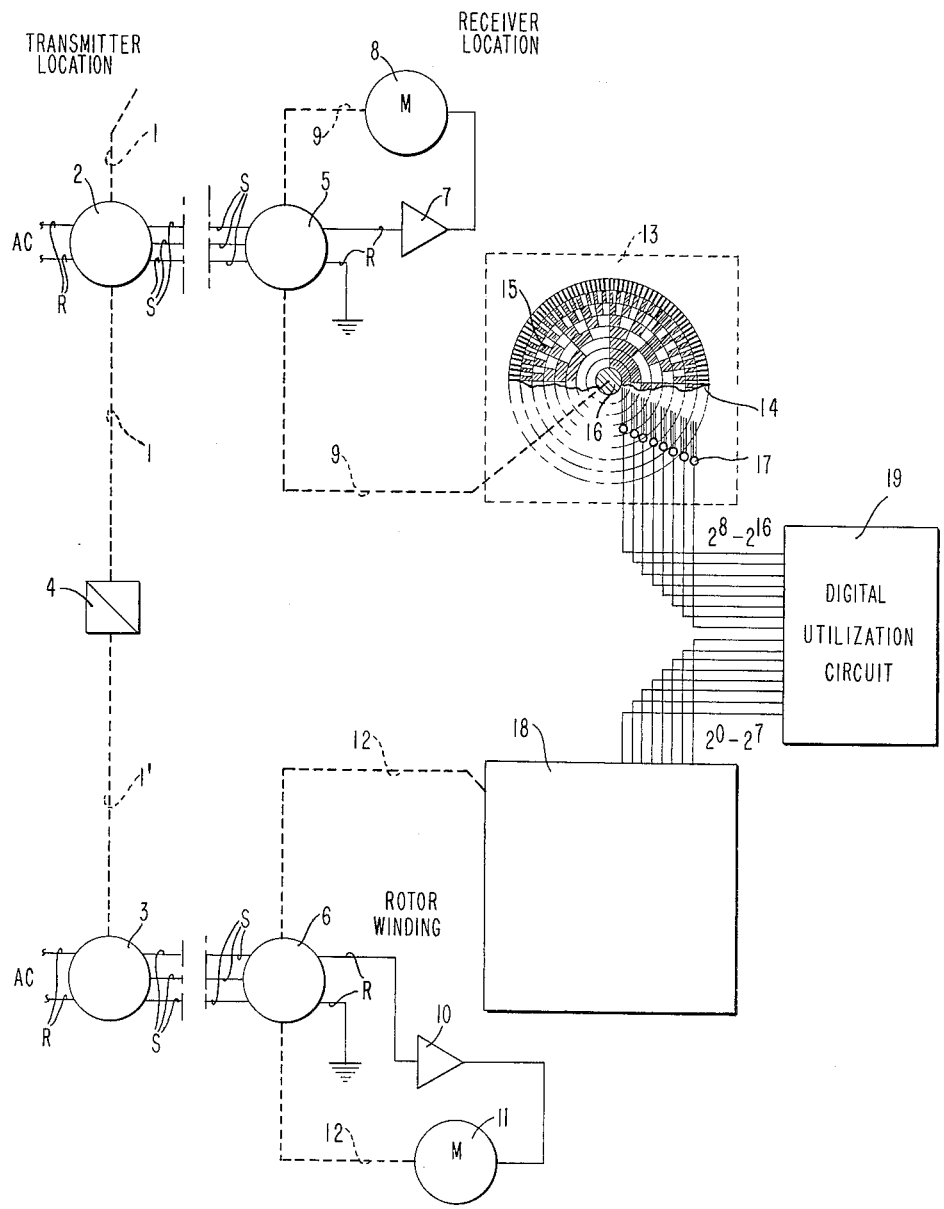

3,156,912
ELECTROMECHANICAL SYSTEM
William R. Maclay, Endicott, N.Y., assignor to International Business Machines Corporation, New York, N.Y., a corporation of New York
Filed Dec. 27, 1960, Ser. No. 78,652
7 Claims. (Cl. 340—347)

The present invention relates to electromagnetic devices and more particularly to an improved means for telemetering analog position information and converting that information to electrical digital information.

In telemetering and electronic computer fields, it is often desirable to convert a mechanical shaft position representing an analog into electronic digital information where each bit position of a selected code is in binary form. Moreover, it is often expeditious to transmit the shaft position analog information to a remote receiver station prior to the conversion to electrical digital information. It is the means for transmitting analog information to a remote location and the conversion of that information to electrical digital information that the present invention is particularly concerned.

One of the ways for transmitting analog information representing an angular shaft position to a remote location is by the use of a synchro generator located to be positioned by the input shaft in combination with a synchro receiver located at the remote location. Plural conductors transmit electrical signals from the synchro generator to the synchro receiver where the input shaft analog is magnetically reproduced within the synchro receiver which in turn may be either of the self-synchronous type or of the synchro control transformer type used in a position servo loop for positioning an output shaft in accordance with the angular position of the input shaft.

Synchro transmitters and receivers can be constructed to reproduce analog shaft angular positions at remote locations with varying degrees of accuracy. One of the ways of improving the accuracy with which the angular position of the input shaft is transmitted to an output shaft to the remote location has been to utilize two or more pairs of synchro generators and receivers for coarse and fine reproduction of the angular shaft position. To provide this operation, the coarse signal generator is driven directly by the input shaft having an angular position to be transmitted while the vernier synchro generator is driven by that input shaft through a speed changing gearing means so as to drive it through a greater angle (and at a greater angular velocity). Similarly, at the remote location, the rotor of the coarse synchro control transformer and the rotor of the vernier synchro control transformer are connected to an output shaft with the same relationship by the use of a speed changing gearing means. A single amplifier channel is connected to receive error signals from both the coarse and vernier synchro control transformers in a manner to energize a motor to drive the output shaft to minimize first the error signal from the coarse synchro receiver and then null the error signal from the vernier synchro receiver.

In order that the combination of an error signal from both the coarse and vernier synchro receivers not derive one or more null conditions, it is necessary that the identical gear ratio selected for the speed changing means between both the coarse and vernier synchro generators and the coarse and vernier synchro receivers be an odd integer. Moreover, in order for the vernier to provide substantial increase in accuracy, it is necessary that the ratio be large. However, if the gear ratio is large, the combination of the error signals from the coarse and vernier receivers in the manner described hereinabove will result in a substantial number of false nulls even though the amplitude of the error signal from the vernier synchro receiver is clipped to a low level.

When it is desired to convert electrical digital information, the angular shaft position representing an analog quantity which has been telemetered to the remote location, conventional techniques would require the attachment to the output shaft of one or more conventional shaft digitizers with each shaft digitizer being separated by a proper speed gearing means in accordance with the number of digital orders of significance associated with the lower speed shaft digitizer. Each speed changing gearing means at the synchro transmitter location, at the synchro receiver location, and in the drive means for the shaft digitizers contributes to the inaccuracy of the digital output information. Furthermore, the large amount of gearing greatly contributes to the physical size of the equipment.

In many applications, it would be desirable both with respect to accuracy and physical size to reduce the amount of gearing required to telemeter shaft analog position information and then convert that information to electrical coded digital information. One way to reduce the gearing required for driving the two or more shaft digitizers is to directly connect a shaft digitizer to the shaft associated with the coarse synchro receiver and directly connect still another shaft digitizer with the vernier synchro receiver. However, such a technique is complicated by the fact that this would be following the usual dual-channel synchro approach requiring that the gear ratio between the synchro generator and the synchro receiver be an even number. This is because binary coded digital information is always even. Thus, the use of an odd integer to avoid the false null problem is not feasible. Yet, it is necessary that the gear ratio between the coarse and vernier synchro generator and the identical gear ratio between the coarse and vernier synchro receivers be large to provide for the desired level of resolution.

In summary, the prior art technique of using plural-channeled synchros to transmit a shaft angle to a remote location followed by connecting one or more shaft digitizers to the output shaft at the remote location to provide for conversion to electrical digital information is not practical engineeringwise.

It is, therefore, a primary object of the present invention to provide a new and improved means for telemetering analog shaft position information and converting that information to electrical binary digital information.

It is another object of the present invention to provide a new and improved means for telemetering shaft analog position information and converting that information to binary digital information using coarse and vernier synchro channels.

It is still another object of the present invention to provide a new and improved means for telemetering shaft analog position information and converting that information to coded digital information using coarse and vernier synchro channels which are not geared together at the receiver location.

It is an additional object of the present invention to provide a new and improved means for telemetering shaft analog position information and converting that information to coded digital information using coarse and vernier synchro channels having a high velocity speed ratio therebetween.

It is still another object of the present invention to provide a new and improved means for telemetering shaft analog position information and converting that information to coded digital information using coarse and vernier synchro channels where the velocity ratio between these channels is an even number while avoiding false null problems at the receiver location.

It is an additional object of the present invention to provide new and improved means for telemetering shaft analog position information and converting that information to binary digital information with coarse and vernier synchro channels requiring minimum gearing and physical size.

The objects of the present invention are provided by a new and improved means for telemetering shaft analog position information and converting that information to coded digital information using coarse and vernier synchro channels where each channel comprises a conventional synchro position servo with a conventional shaft digitizer connected thereto and the coarse and vernier channels being geared together only at the transmitter location.

The foregoing and other objects, features, and advantages of the invention will be apparent from the following more particular description of a preferred embodiment of the invention, as illustrated in the accompanying drawing.

In the drawing:

The single figure shows an electrical block diagram of a preferred embodiment of the present invention.

Referring to the single figure, there is shown means to transmit an analog signal commensurate with the angular position of shaft 1 from a transmitter location to a receiver location for the purpose of converting that angular signal to an electrical binary digital information signal in accordance with the present invention. As an example of a conventional means of transmitting this analog signal, synchro generators 2 and 3 are shown having a rotor being positioned by the input shaft 1. These synchro transmitters may be any one of a number of conventional designs exemplified by a synchro generator shown in FIG. 2.7, page 28 of textbook entitled Servomechanism Fundamentals by Lauer, Lesnick and Matson, McGraw-Hill Book Company, New York, 1947.

Conventionally, such a generator comprises a stator of three windings arranged to be physically displaced by 120° with a single winding on the rotor energized by an A.C. supply voltage. Synchro generator 2, as shown, will operate as a coarse transmitter while synchro generator 3 will operate as the vernier transmitter. Since it is desired to convert shaft position 1 to electrical digital information at the remote location, the gear ratio of conventional speed changing means 4 is selected in accordance with the number of orders of significance which is desired to make one revolution of the rotor of synchro generator 2 represent. For example, the ratio may be 1/256 representing $2^8$. Accordingly, as shaft 1 is rotated through one revolution, a modulated A.C. carrier voltage is generated in each of the stator windings of synchro generator 2 defining an A.C. magnetic flux vector which also rotates through 360°. Simultaneously, synchro generator 3 generates voltages on stator windings therein which define an A.C. magnetic flux vector which rotates through 256 times 360°.

The stator windings of synchro generator 2 are connected, as shown, to the stator windings of conventional synchro receiver 5. The stator windings of synchro transmitter 3 are connected, as shown, to stator windings of synchro receiver 6. By way of example, synchro receivers 5 and 6 may be of the same construction as that of the synchro motor shown in FIG. 2.10, page 31 of the above-identified textbook entitled Servomechanism Fundamentals.

In a well-known manner, the A.C. magnetic flux vector defined by the voltages applied to the stator windings of synchro receivers 5 and 6 will induce voltages in the rotor windings of each of these devices as a function of the alignment of the rotor winding with the A.C. magnetic flux vector being defined. Accordingly, an error signal will be induced in the rotor winding of each of synchro receivers 5 and 6 accordingly to this alignment error.

In accordance with well-established techniques, the error voltage from synchro receiver 5 is applied to an amplifier 7 which energizes a motor 8. Motor 8 in turn drives the rotor of the synchro receiver through an output shaft 9 in a direction to align the rotor winding of synchro receiver 5 through the A.C. magnetic flux vector being defined by the voltages being applied to its stator winding by synchro generator 2.

Similarly, referring to synchro receiver 6, the error voltage being induced in its rotor winding resulting from the misalignment of that rotor winding may be applied to an amplifier 10 which in turn energizes a motor 11. The motor in turn drives the rotor of the synchro receiver 6 through output shaft 12 until its rotor winding is aligned with the A.C. magnetic flux vector being defined by the voltages applied to the stator windings.

Output shaft 9 is then connected directly to a conventional shaft digitizer 13, as shown, for the purpose of converting its analog position to electrical binary digital information. Similarly, output shaft 12 is then connected directly to a conventional shaft digitizer 18, as shown, for the purpose of converting its analog position to electrical binary digital information.

Shaft digitizer 13 is shown as of conventional construction comprising a disc 14 with conducting segments 15 arranged thereon, along annular rings, with a pattern which is dependent on the particular digital code being utilized and the order of significance with which the segment is to correspond. In keeping with the example being depicted, there are eight annular rings corresponding to eight orders of binary significance. The hub 16 of the disc is energized and a pick-up brush 17 associated with each annular ring such that output conductors are energized in accordance with the instantaneous electrical binary digital representation of the analog angular position of output shaft 9.

Shaft digitizer 18 is connected to output shaft 12 for the purpose of converting its analog angular position to electrical binary information in the same manner as described in detail with respect to shaft digitizer 13. Shaft digitizer 18 may be of identical construction with shaft digitizer 13. Accordingly, the output conductors from the shaft digitizer are energized in accordance with the binary digital representation of the analog angular position of output shaft 12.

Because:

(1) Output shaft 12 is positioned in accordance with the angular position of the rotor of vernier synchro generator 3;
(2) Speed changing gearing means 4 drives the rotor of the synchro generator 3 at 256 times the velocity of input shaft 1; and
(3) There are eight annular rings on shaft digitizer 18 (identical with shaft digitizer 13);

the output conductors of shaft digitizer 18 are energized in accordance with the electrical binary digital representation of the input shaft 1 with binary orders of significance from $2^0$ through $2^7$.

Simultaneously, the conductors of shaft digitizer 13 provide binary digital output information representing the angular position of input shaft 1 from $2^8$ through $2^{16}$ orders of binary significance. The conductors from shaft digitizers 13 and 18 are shown connected to a digital utilization circuit.

Reference is again made to the prior art wherein coarse and vernier synchro channels were utilized with a single output shaft and a single servo follow up for telemetering of shaft analog information followed by conversion of that information to electrical digital information by the connection to the output shaft of two or more conventional shaft digitizers.

Considerable sources of inaccuracies are present in that technique. For example, each gear changing means between the coarse and vernier generators, the coarse and vernier receivers, and the plural shaft digitizers contributes to inaccuracies. The mixing of the error signals from the coarse and vernier receivers also contributes considerable inaccuracy. Moreover, the accuracy of the individual synchros contributes to the inaccurate position of the single output shaft. In addition to the accuracy problem, the large number of gears contributes to an increase of physical size of the total telemetering and conversion equipment.

In contrast to the above, when using the teachings of the present invention, the accuracy of the synchros is not important as long as it is greater than the binary speed gearing ratio selected for the gearing means between the coarse and vernier synchro generators. For example, synchros having an acuracy of one-half of a degree are readily obtainable and economical. Based on that accuracy, the synchros are dividing one input shaft revolution in 720 parts. Utilizing the teachings of the present invention and referring to the specific example described, it is only necessary that the synchros have an accuracy of better than one part in 256, the binary speed ratio between the coarse and vernier synchro transmitters. As indicated hereinabove, that binary speed ratio was selected because the output shaft 12 of the vernier synchro servo follow up is shown driving a shaft digitizer capable of a resolution $2^0$ through $2^7$. One part in 251 represents the maximum accuracy required by the vernier synchro generators. Since there is no mixing of the error signals from the coarse and vernier receivers, no inaccuracy is contributed from that source. Accordingly, the only limitation on the telemetering and the conversion of the analog position of the input shaft 1 is the inaccuracy of the single speed changing gearing means 4, yet the resolution of the digital output is $2^{16}$. Since only one speed changing gearing means is required, the physical size of the total equipment is thereby decreased.

A very high response rate is another advantage of the teachings of the present invention. By way of example, assume that the input shaft 1 is slewing at a high rate while the vernier channel, being limited in its response, is not able to follow (even to the point of oscillating erratically). As long as the coarse synchro channel can follow, the higher order of binary digital information generated in the output of shaft digitizer 13 will represent the most significant part of the output information even though the output of shaft digitizer 18 is inaccurate. When the angular rotor of input shaft 1 slows down, the vernier synchro channel will never be in error more than one-half of a revolution, and the binary digital output information is corrected to $2^{16}$ orders of significance in a very short time. However, the binary digital output information is always accurate with respect to $2^8$ to $2^{16}$ orders of significance.

It should be understood that many changes can be made in the figure as described in detail hereinabove without departing from the teachings of the present invention. For example, while two channels are shown, it should be understood that more than two channels can be utilized with appropriate gearing selected for use between the synchro transmitters alternately to input shaft 1.

Moreover, while the synchro generators and receivers have been shown as being of a particular construction, there is a wide range of electromechanical equivalents which perform the same function in the same manner.

Furthermore, the synchro receiver does not necessarily require a servo torque amplifier to position the output shaft if the loading is small enough that a conventional self-synchronous receiver will be sufficient. It should be noted that the servo amplifier loops, as shown, do not include the well-known refinements exemplified by velocity damping or gearing which may be required to apply the teachings of the present invention to a practical embodiment. Such refinements are thought to be well within the knowledge of one skilled in the art and their inclusion thereof in the drawing would serve only to unnecessarily complicate the description of the advance in the art being described. While simple brush type shaft digitizers are shown, it should be clear that other types and refinements thereof have utility in the practice of the teachings of the present invention.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A means for telemetering shaft analog position information and converting that information into electrical digital information comprising; an input shaft; coarse and vernier synchro channels; each of said coarse and vernier synchro channels consisting of a synchro position servo; an output shaft connected to each of said servos; a shaft digitizer means connected to each of said coarse and vernier output shafts; each of said coarse and vernier synchro position servos having a transmitting and receiving location; gear speed changing means connected between the coarse and vernier channels at the transmitting location having an even and substantially large gear ratio; said input shaft providing an input to said coarse and vernier synchro position servos at the transmitting location.

2. A means for telemetering shaft analog position information and converting that information to coded digital information comprising; an input shaft; coarse and vernier synchro channels; a coarse output shaft; a vernier output shaft; each of said coarse and vernier synchro channels consisting of a synchro position servo for positioning said coarse and vernier output shafts at a remote location; a shaft digitizer means connected to each of said coarse and vernier output shafts in accordance with the angular position of said input shaft; a gear speed changing means connected between the coarse and vernier channels at the transmitting location having an even and substantially large ratio.

3. A means for telemetering shaft analog position information and converting that information to coded digital information comprising; an input shaft at a transmitting location; N output shafts at a receiving location; N synchro channels each for positioning one of said output shafts; said input shaft providing an input directly into one of said N synchro channels; said input shaft providing an input into each of said $N-1$ other synchro channels through gear changing means of progressively selected binary weighted ratios; a binary shaft digitizer means connected to each of said output shafts; each of said binary shaft digitizers providing electrical binary digital output information according to an order of significance corresponding to said selected binary weighted gear ratios.

4. A means for telemetering shaft analog position information and converting that information to coded digital information comprising; an input shaft at a transmitting location; N output shafts at a receiving location; N synchronous electromechanical channels each for positioning one of said output shafts; said input shaft providing an input directly into one of said N synchronous electromechanical channels; said input shaft providing an input into each of said other $N-1$ synchronous electromechanical channels through gear changing means of progressively selected binary weighted ratios; a binary shaft digitizer means connected to each of said output shafts; each of said binary shaft digitizers providing electrical binary digital output information according to an order of significance corresponding to said selected binary weighted gear ratios.

5. An analog-to-digital converter comprising; an input shaft having an instantaneous angular position which it is desired to convert to an electrical digital output signal; a first synchro position servo connected to receive an input from said input shaft commensurate with the instantaneous angular position of the said shaft; a gear speed changing means; a second synchro position servo connected to said input shaft through said gear changing means; each of said synchro position servos having an output shaft; a first shaft digitizer means connected to the output shaft of said first synchro position servo; a second shaft digitizer means being connected to the output shaft of said second synchro position servo; said gear speed changing means increasing the magnitude of the input shaft angle to the second synchro position servo by an amount equal to the resolution of said first shaft digitizer means; said first and second synchro position servos co-acting to transmit the analog of the input shaft position to a remote location prior to conversion of the analog of the input shaft angular position to binary digital information.

6. An analog-to-digital converter comprising; an input shaft having an instantaneous angular position which it is desired to convert to an electrical digital output signal; a first synchro position servo connected to receive an input from said input shaft; a gear speed changing means; a second synchro position servo connected to said input shaft through said gear changing means; each of said synchro position servos having an output shaft; a first shaft digitizer being connected to the output shaft of said first synchro position servo; a second shaft digitizer being connected to the output shaft of said second synchro position servo; said first synchro position servo and shaft digitizer providing a digital output of plural higher orders of binary significance in accordance with the angular position of said input shaft; said second synchro position servo and shaft digitizer providing a digital output of plural lower orders of binary significance in accordance with the angular position of said input shaft.

7. An analog-to-digital converter comprising; an input shaft having an instantaneous angular position which it is desired to convert to an electrical digital output signal; a first synchro transmitter having a rotor and an electrical output; said rotor of said first synchro transmitter being connected to be positioned in accordance with said input shaft; a gear speed changing means; a second synchro transmitter having a rotor and an electrical output; said rotor of said second synchro transmitter being connected to be positioned in accordance with said input shaft through said gear speed changing means; a first synchro receiver having a rotor and electrical input and electrical output connected to receive an electrical input from said first synchro transmitter; a second synchro receiver having a rotor and an electrical input and output connected to receive an electrical input from said second synchro transmitter; said synchro transmitters and said synchro receivers being physically positioned remotely from one another; a first output shaft associated with said first synchro receiver; the rotor and electrical output of said first synchro receiver being connected with said first output shaft through a position servo follow-up loop; a second output shaft associated with said second synchro receiver; the rotor and electrical output of said second synchro receiver being connected with said second output shaft through a servo follow-up loop; a first shaft digitizer being connected to said first output shaft; a second shaft digitizer being connected to said second output shaft; said first synchro transmitter, synchro receiver, and shaft digitizer providing a digital output of plural higher orders of binary significance; said second synchro transmitter, synchro receiver, and shaft digitizer providing a digital output of plural lower orders of binary significance.

References Cited in the file of this patent
UNITED STATES PATENTS
2,980,900    Rabin _____ Apr. 18, 1961